US010548262B2

United States Patent
Simmons (10) Patent No.: US 10,548,262 B2
(45) Date of Patent: Feb. 4, 2020

(54) STRAND TRIMMER WITH A STRAND FEED MECHANISM

(71) Applicant: Trimverse LLC, Easton, KS (US)

(72) Inventor: Robert Simmons, Easton, KS (US)

(73) Assignee: Trimverse LLC, Easton, KS (US)

( * ) Notice: Subject to any disclaimer, the term of this patent is extended or adjusted under 35 U.S.C. 154(b) by 332 days.

(21) Appl. No.: 15/495,540

(22) Filed: Apr. 24, 2017

(65) Prior Publication Data
US 2017/0303467 A1 Oct. 26, 2017

Related U.S. Application Data

(60) Provisional application No. 62/327,013, filed on Apr. 25, 2016.

(51) Int. Cl.
| A01D 34/416 | (2006.01) |
| A01D 34/835 | (2006.01) |
| A01D 101/00 | (2006.01) |

(52) U.S. Cl.
CPC ....... *A01D 34/4161* (2013.01); *A01D 34/416* (2013.01); *A01D 34/835* (2013.01); *A01D 2101/00* (2013.01)

(58) Field of Classification Search
CPC .............. A01D 34/4161; A01D 34/416; A01D 34/412; A01D 34/4162; A01D 34/4163; A01D 34/835; A01D 2101/00
See application file for complete search history.

(56) References Cited

U.S. PATENT DOCUMENTS

| 3,599,403 A | 8/1971 | Gantz |
| 3,665,685 A | 5/1972 | Allard |
| 4,091,536 A * | 5/1978 | Bartholomew .... A01D 34/4161 30/276 |
| 4,118,864 A | 10/1978 | Pittinger, Sr. et al. |
| 4,131,997 A | 1/1979 | Utter |
| 4,138,810 A * | 2/1979 | Pittinger, Sr. ...... A01D 34/4162 30/276 |
| 4,271,594 A | 6/1981 | Kilmer |
| 4,663,920 A | 5/1987 | Skovhoj |
| 4,697,405 A | 10/1987 | DeWitt et al. |

(Continued)

FOREIGN PATENT DOCUMENTS

EP  1305993 B1  12/2006

*Primary Examiner* — Alicia Torres
*Assistant Examiner* — Adam J Behrens
(74) *Attorney, Agent, or Firm* — Erickson Kernell IP, LLC; Kent R. Erickson (57) ABSTRACT

A strand trimmer and method of use thereof. The strand trimmer includes a pair of pivotable arms each having a motor, a follower wheel, and a cutter-spindle assembly disposed thereon. The arms are biased toward one another and are guided by the follower wheels to pivot around obstacles passing between the arms. The motor rotates the cutter-spindle assembly to move cutting strands extending therefrom through a cutting path with sufficient rotational velocity to cut vegetation. The cutter-spindle assembly includes a spool and a strand-feed mechanism. The spool is oriented to rotate about a horizontal axis. The strand-feed mechanism includes a solenoid actuated plunger within a shaft of the cutter-spindle assembly. The plunger engages the spool to control rotation of the spool and thereby feeding out of incremental lengths of the strand.

1 Claim, 10 Drawing Sheets

(56) References Cited

U.S. PATENT DOCUMENTS

| | | | | |
|---|---|---|---|---|
| 4,707,919 A | * | 11/1987 | Tsuchiya | A01G 3/06 |
| | | | | 30/276 |
| 5,174,100 A | | 12/1992 | Wassenberg | |
| 5,396,754 A | | 3/1995 | Fraley | |
| 6,487,838 B2 | | 12/2002 | Handlin | |
| 6,684,614 B2 | | 2/2004 | Greenwell | |
| 6,860,093 B2 | | 3/2005 | Scordilis | |
| 6,862,811 B2 | | 3/2005 | Mitchell | |
| 6,959,528 B1 | | 11/2005 | Scordilis | |
| 7,017,272 B2 | | 3/2006 | Grace | |
| 7,363,754 B2 | | 4/2008 | Cartner | |
| 7,467,470 B2 | | 12/2008 | Robison | |
| 7,690,177 B2 | | 4/2010 | Spitzley | |
| 8,910,458 B2 | | 12/2014 | Goudy | |
| 9,084,392 B2 | | 7/2015 | Goudy | |
| 9,253,942 B2 | | 2/2016 | Alliss et al. | |
| 9,560,803 B2 | | 2/2017 | Kobayashi | |
| 2004/0148784 A1 | * | 8/2004 | Grace | A01D 34/4163 |
| | | | | 30/276 |
| 2005/0091853 A1 | | 5/2005 | Mitchell | |
| 2005/0193700 A1 | | 9/2005 | Bares | |
| 2006/0005520 A1 | | 1/2006 | Weidman | |
| 2008/0282554 A1 | | 11/2008 | Grace | |
| 2010/0223897 A1 | | 9/2010 | Mills | |
| 2015/0135669 A1 | | 5/2015 | Hafner | |
| 2016/0345493 A1 | | 12/2016 | Ma et al. | |

* cited by examiner

STRAND TRIMMER WITH A STRAND FEED MECHANISM

CROSS-REFERENCE TO RELATED APPLICATIONS

This application claims the benefit of U.S. Provisional Patent Application No. 62/327,013, filed Apr. 25, 2016, the disclosure of which is hereby incorporated herein in its entirety by reference.

BACKGROUND

Cutting of vegetative growth around structures and other obstacles is a common problem faced by municipalities, home owners, and the like. Mowers are generally not well suited for cutting grass, weeds, or other growth in very close proximity to structures and other obstacles such as fence rows, guard rails, and trees. A variety of trimming devices have been developed that are maneuverable into close proximity to the structures or obstacles. These devices commonly use one or more sacrificial strands extending radially outward from a hub that is spun at high rotational speeds to enable the strands to cut through the vegetation upon impact. The strands are worn down, broken off, or otherwise shortened over time and must be replaced.

Known trimming devices provide a coil of the strand on the trimming device which can be actuated to allow additional strand to be fed out to replace the worn or lost portions of strand. The coil of strand is disposed to lie in a horizontal plane such that centrifugal forces act to feed out the strand. Available coil and feed mechanism often fail to feed out strand properly due to improper operation or jamming of the strand within the mechanism. These mechanisms are also difficult and time consuming to reload with new strand.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a strand trimer with a strand feed mechanism and a replaceable strand cartridge.

The strand trimmer includes a frame assembly formed from a cross-member with a downwardly depending leg extending from each end thereof. A trimmer arm is pivotably coupled to a distal end of each leg. The trimmer arms each include a cutter-spindle assembly, a motor for rotatably driving the cutter-spindle assembly, a follower wheel, and a bias apparatus. The cutter-spindle assembly is disposed coaxially with the follower wheel which has an outer diameter that is approximately equal to an operating radius of the strand. The bias apparatus biases the trimmer arm in pivotal movement toward the opposite trimmer arm.

The trimmer arms may be disposed on opposite sides of a guard rail or fence row and drawn along the length of the guard rail or fence to trim vegetation growing in close proximity to posts of the guard rail/fence and under the guard rail or fence. When encountering the posts, the follower wheels contact the post and pivot the respective trimmer arm away from the post to allow the post to pass between the trimmer arms. The bias apparatus then draws the trimmer arms back toward the guard rail/fence after passing the post.

The cutter-spindle assembly includes a vertically aligned shaft with a strand canister disposed at a top end and a strand head disposed at the bottom end thereof. The strand canister houses a spool on which a pair of strands are coiled. Ends of the strands extend downward through a hollow in the shaft to the strand head. The strand head includes a pair of interior channels that divert the strand from a vertical path to a radially extending horizontal path. A strand-feed plunger is disposed within the shaft and is moveable axially within the shaft by operation of a solenoid and a return spring.

In one embodiment, the strand-feed plunger includes teeth or similar features that engage the strands as they pass thereby and when actuated by a solenoid pushes the strand downward to feed the strand out of the strand head. The teeth are configured to engage the strands in one direction but to enable movement of the plunger relative to the strand in the opposite direction.

In another embodiment, the strand-feed plunger employs centrifugal and tension forces applied to the strands to draw the strands from the spool. The strand-feed plunger includes a prong that extends to engage slots provided in the circumference of the spool. Actuation of the plunger by energizing the solenoid disengages the prong from the slot to allow the spool to rotate and feed out a length of the strands. Upon release by the solenoid, the return spring returns the plunger and the prong into engagement with another of the slots in the spool.

The cutter-spindle assembly enables reliable dispensing of the strand during operation of the strand trimmer and during rotation of the cutter-spindle assembly. The assembly also enables simple and quick reloading or replacement of the spool when the length of strands thereon is exhausted.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

With reference now to FIGS. 1-6, a strand trimmer 10 is described in accordance with an exemplary embodiment. The strand trimmer 10 is described herein with respect to applications in which the strand trimmer 10 is coupled to a boom 4 of a backhoe 6 or similar tractor and for trimming vegetation around a guard rail 8, however embodiments are not so limited. Embodiments of the strand trimmer 10 can be coupled to a variety of other tractors, vehicles, carriages, or the like and can be employed for trimming vegetation around fences, trees, shrubs, edging, or the like.

The strand trimmer 10 comprises a frame 12 and a pair of trimmer arms 14 pivotably coupled thereto. The frame 12 comprises a cross-member 16 and a pair of legs 18 extending from each end thereof. In an operational orientation, the cross-member 16 is disposed to extend generally horizontally with the legs 18 extending generally vertically downward toward a ground surface. However, it is foreseen that the strand trimmer 10 might be employed in other orientations to trim vegetation or foliage growing alongside a roadway or partially overhead.

The cross-member 16 is disposed to extend through a mounting sleeve 20 and to be slideably moveable within the sleeve 20. An actuator 22 is coupled between the sleeve 20 and the cross-member 16 to move the cross-member 16 relative to the sleeve 20. The actuator 22 and additional actuators described subsequently herein are preferably hydraulic actuators but other forms of actuators or extensible means may be employed in exemplary embodiments without departing from the scope described herein. The cross-member 16 is thus moveable within the sleeve 20 to move the strand trimmer 10 side-to-side.

A boom-mount 24 is rotatably coupled to the mounting sleeve 20 via one or more bearings, ball joints, or the like. The boom-mount 24 comprises a plate or similar structure adapted to couple to a distal end of the boom 4 of the tractor 6. A coupler (not shown) such as a proprietary coupler for a particular tractor 6 might also be coupled to the boom-mount 24 to aid use with the particular tractor 6. An actuator 28 is coupled between the sleeve 20 and the boom-mount 24. The actuator 28 is thus extensible to at least partially rotate the strand trimmer 10 relative to the boom-mount 24.

Each of the legs 18 is rigidly mounted at a respective end of the cross-member 16. The trimmer arms 14 are pivotably or rotatably coupled to the distal ends of the legs 18 to enable at least partial rotation thereof in a plane perpendicular to the length of the legs 18 and generally parallel to the ground surface. At least one of the legs 18 may include a roller guide 30 disposed along the length thereof and extending generally toward to opposite leg 18. The roller guide 30 includes a roller 32, wheel, guide, or similar component positioned to contact a surface of the guard rail 8 or other feature being trimmed around and to guide movement of the strand trimmer 10 along the guard rail 8. The roller guide 30 can aid to maintain the strand trimmer 10 centered over the guard rail 8 during operation. A sensor or switch (not shown) may be associated with the roller guide 30 to sense whether the roller guide 30 is in contact with the guard rail 8 and to control operation of the actuator 28 to move the frame 12 and maintain the strand trimmer 10 centered over the guard rail 8 during operation.

The trimmer arms 14 each include a body 34, a motor 36, a follower wheel 38, and a cutter-spindle assembly 40. The body 34 includes a generally planar top surface with a downwardly extending guard flange 42 extending at least partially around the perimeter thereof. The guard flange 42 is preferably configured and positioned to obstruct the path of debris, such as cut vegetation, rocks, and other items thrown during the trimming operation to lessen the risk of such items striking persons or objects near the strand trimmer 10.

Figure 1:
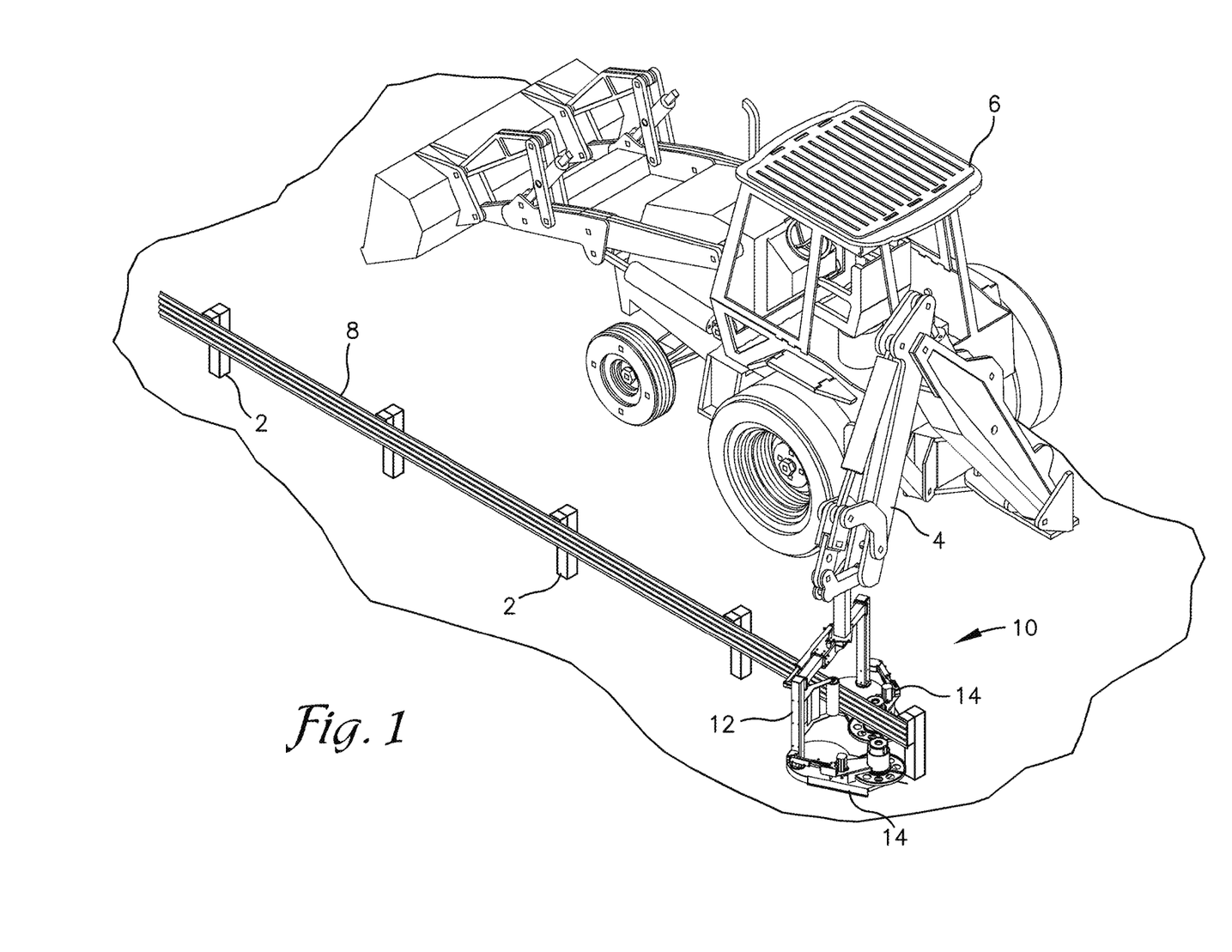
FIG. 1 is perspective view of a strand trimmer engaged around a guard rail and attached to the boom of a tractor depicted in accordance with an exemplary embodiment.
Figure 2:
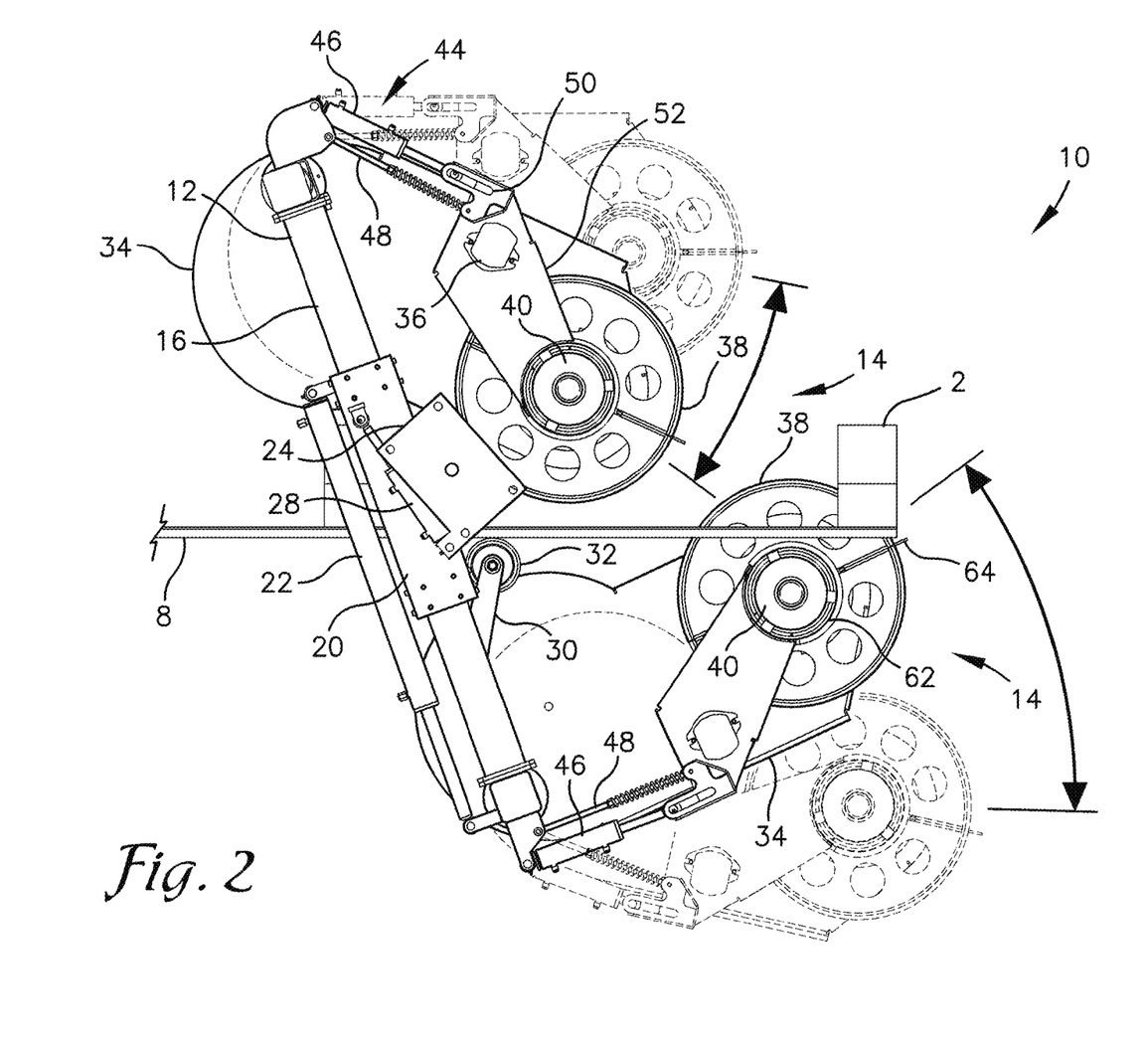
FIG. 2 is a top plan view of the strand trimmer of FIG. 1 depicting pivotal movement of trimmer arms.
Figure 4:
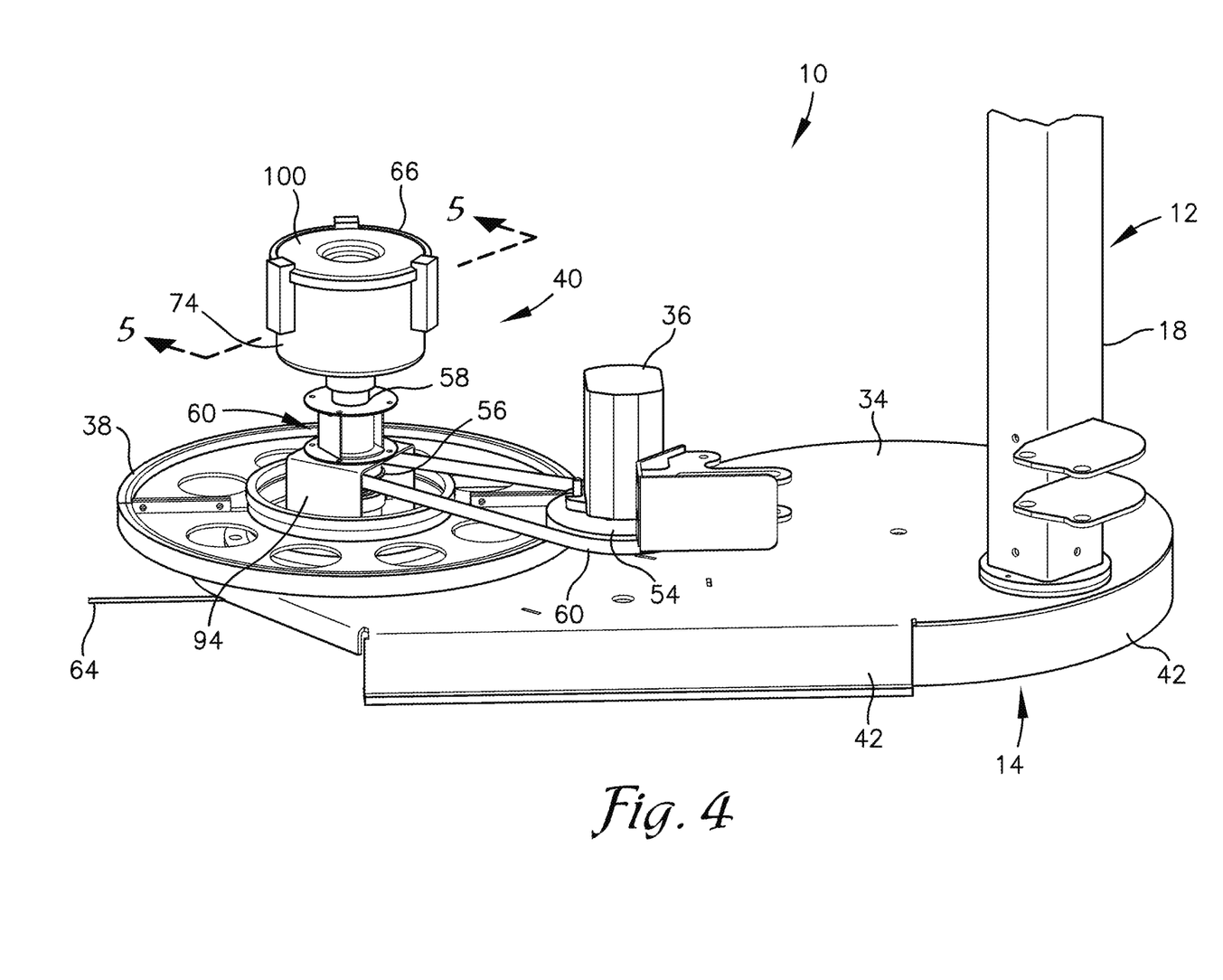
FIG. 4 is a side perspective view of a trimmer arm of the strand trimmer of FIG. 1 with portions removed to show internal components depicted in accordance with an exemplary embodiment.

A biasing mechanism 44 is coupled between the leg 18 and the body 34 and is configured to bias the body 34 in pivotal movement toward the opposite trimmer arm 14. As depicted in FIGS. 1, 2, and 4, the biasing mechanism 44 comprises an actuator 46 and a spring-biased, telescoping rod 48 arranged in a parallelogram configuration. However, the biasing mechanism 44 can comprise other components and configurations in other embodiments without departing from the scope described herein.

One or both of the actuator 46 and the rod 48 may apply a biasing force on the trimmer arm 14 toward pivotal movement. In one embodiment, the actuator 46 is operated to move the trimmer arm 14 against the biasing force of the rod 48 to pivot the trimmer arms 14 away from one another, such as when initially engaging or disengaging the guard rail 8. The actuator 46 may then be placed in a floating mode to enable the rod 48 to pivot the trimmer arm 14. Or the actuator 46 may couple to the body 34 via a slotted aperture 50 within which the coupling of the actuator 46 may freely move to allow pivotal movement of the trimmer arm 14 during trimming without actuation of the actuator 46.

The body 34 may also include a mounting bracket 52 or guard on which the motor 36 may be mounted above the top surface of the body 34. The motor 36 preferably comprises a hydraulic motor configured to drive the cutter-spindle assembly 40 in rotational motion, but other forms of motor can be employed including, for example, electric, mechanical, or pneumatic motors, among others. As depicted in FIG. 4, the motor 36 is spaced above the top surface of the body 34 to provide alignment between a drive pulley 54 disposed on the motor shaft and a spindle-pulley 56 on the cutter-spindle assembly 40. The spindle-pulley 56 may comprise a pulley or similar component coupled to a shaft 58 or an annular groove formed integral with the shaft 58 of the cutter-spindle assembly 40. The drive pulley 54 and the spindle-pulley 56 are drivingly coupled via a belt 60, chain, or similar component and can be configured with a desired gear ratio sufficient to provide a desired rotational speed to the cutter-spindle assembly 40.

A spindle collar 62 is disposed at or near a distal end of the trimmer arm 14. The spindle collar 62 comprises an annular wall extending vertically upward from the top surface of the body 34 and having a diameter sufficient to receive the cutter-spindle assembly 40 axially therein. The follower wheel 38 is rotatably coupled to the exterior surface of the spindle collar 62, such as via one or more bearings. The follower wheel 38 lies in a substantially horizontal plane and has a radial dimension that is just smaller than that of a path of a strand 64 extending from the cutter-spindle assembly 40. However, the strand 64 and/or the follower wheel 38 can be dimensioned such that the strand path extends a substantially equal distance to the follower wheel 38 or a shorter distance than the follower wheel 38. As such, contact between the strand 64 and an obstacle can be allowed or eliminated as desired.

Figure 5:
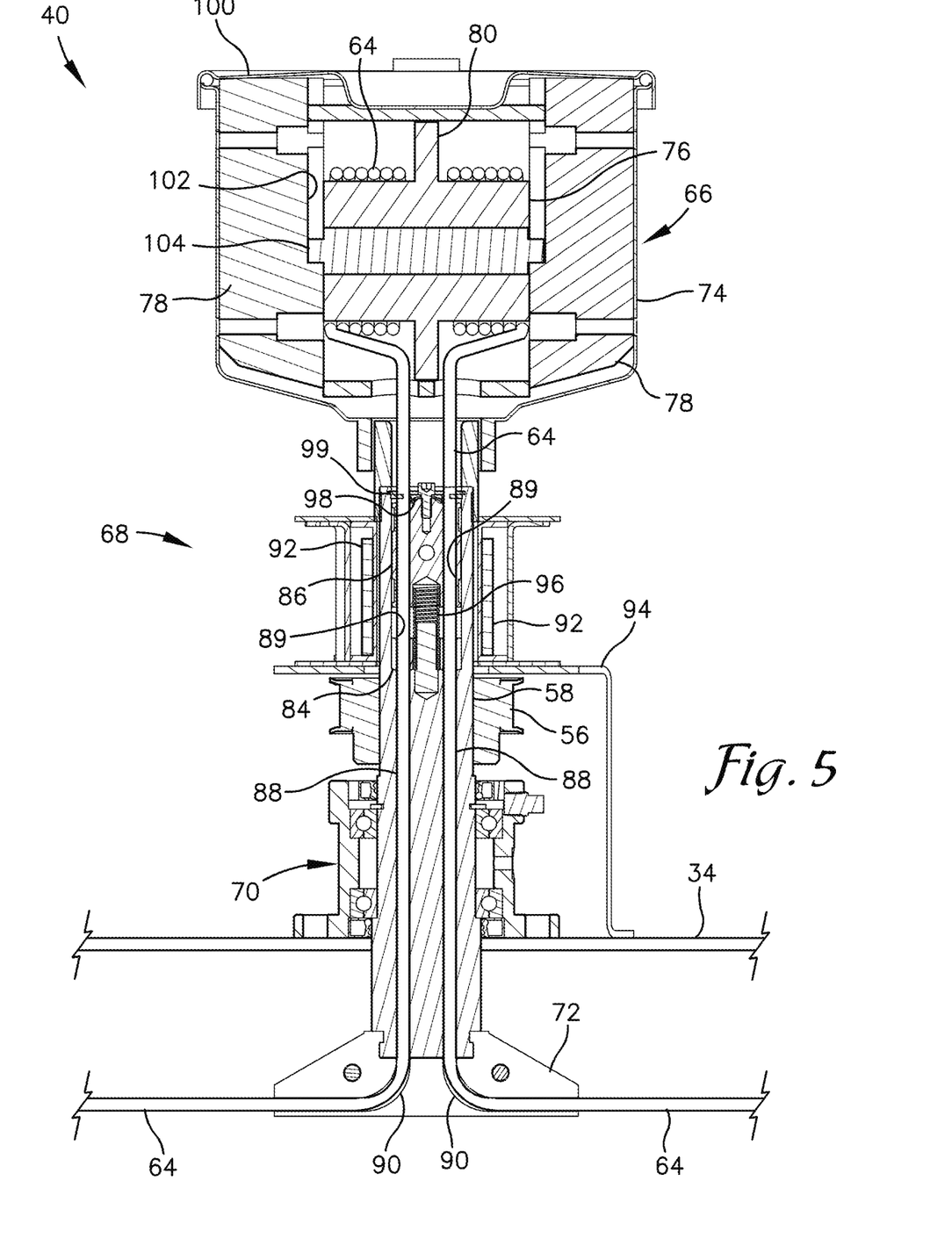
FIG. 5 is a cross-sectional view of a cutter-spindle assembly for the strand trimmer of FIG. 1 depicted in accordance with an exemplary embodiment and taken along line 5-5 of FIG. 4.
Figure 6:
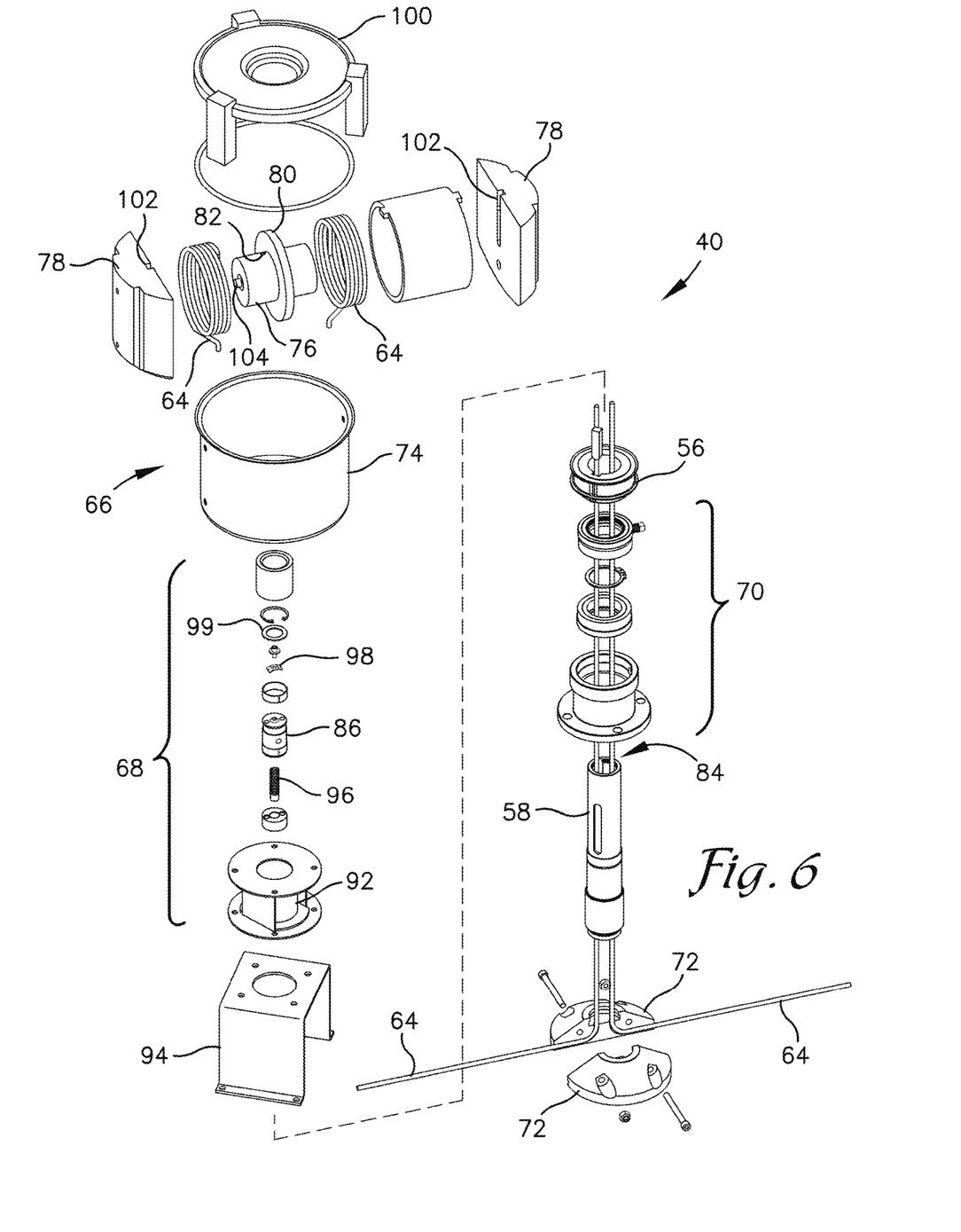
FIG. 6 is an exploded view of the cutter-spindle assembly of FIG. 5.

The cutter-spindle assembly 40 is rotatably disposed within the spindle collar 62. The cutter-spindle assembly 40 includes the shaft 58 with the spindle-pulley 56 disposed along the length thereof, a strand canister 66 coupled to a top end of the shaft 58, a strand-feed mechanism 68, a bearing assembly 70, and a strand head 72 disposed at a bottom end of the shaft 58. The cutter-spindle assembly 40 is vertically or axially supported within the spindle collar 62 by the bearing assembly 70.

The bearing assembly 70 comprises an available bearing assembly and is coupled between the top surface of the body 34 and the shaft 58 to enable relative rotational motion therebetween. In another embodiment, the collar 62 may engage the cutter-spindle assembly 40 to vertically support the assembly 40 but also to allow rotational motion of the assembly 40 within and relative to the collar 62. For example, the bearing assembly 70 might be disposed between the spindle collar 62 and the cutter-spindle assembly 40.

The strand canister 66 comprises a generally cylindrical housing 74 and a strand spool 76 disposed therein to be rotatable about a generally horizontal axis. The strand canister 66 is rigidly coupled to the shaft 58 and rotates therewith about a generally vertically aligned axis extending along the length of the shaft 58 during operation of the strand trimmer 10. A pair of spacers 78 are disposed within the housing 74 to support the spool 76 generally along a diameter of the housing 74. The spool 76 includes an annular spline 80 disposed centrally along the thickness or circumference thereof that divides the circumferential surface of the spool 76 into two sections. A separate segment of the strand 64 is coiled or wrapped around each of the two sections. A bore 82 may be provided in the circumferential face of each section into which first ends of the sections of strand 64 can be inserted to anchor the strands 64 to the spool 76 to aid coiling of the strands 64 therearound. Opposite second ends of the strands 64 extend through an opening 83 in a bottom wall of the housing 74 and into a plunger-bore 84 in the shaft 58.

The plunger-bore 84 extends a distance into and coaxially with the shaft 58 and provides a space within the shaft 58 in which a piston, core, or plunger 86 of the strand-feed mechanism 68 (described below) is disposed. A pair of strand-passages 88 extend from an end surface of the plunger-bore 84 to the distal end of the shaft 58 to communicate the strands 64 to the strand head 72. The plunger 86 includes longitudinal apertures 89 extending therethrough and in alignment with the strand-passages 88 such that the strands 64 can be easily fed or guided into the strand-passages 88. The strand head 72 couples to the distal or bottom end of the shaft 58 and includes a pair of interior passages 90 that are aligned at a first end with the strand-passages 88 of the shaft 58 to receive the strands 64 therefrom. The interior passages 90 turn approximately ninety degrees to direct the strands 64 generally horizontally or radially outward from the strand head 72. In another embodiment, the strand head 72 may be formed integrally with the shaft 58.

The strand-feed mechanism 68 is disposed along the length of the shaft 58 and in radial alignment with the plunger-bore 84. The strand-feed mechanism 68 comprises the plunger 86 disposed within the plunger-bore 84 and a solenoid 92 disposed exterior to the shaft 58. The solenoid 92 may encircle the shaft 58 or may be disposed along a side thereof. The solenoid 92 comprises an electromagnetic device configured to produce a magnetic field that is operable to move the plunger 86 within the plunger-bore 84 or may comprise another mechanical and/or magnetic means operable to move the plunger 86. For example, a mechanical linkage might be provided and configured to move a permanent magnet toward and away from the shaft to bring the magnet into sufficient proximity to the plunger 86 to cause movement thereof.

A support bracket 94 is provided to fixedly support the solenoid 92; the solenoid 92 does not rotate with the shaft 58. The support bracket 94 has a generally inverted U-shaped form and is coupled to the top surface of the body 34 interior to the spindle collar 62. The shaft 58 passes through an aperture in an apex portion of the support bracket 94 which may be sized to avoid contact with the shaft 58 or may include a bearing surface or one or more bearings to rotationally support the shaft 58 within the aperture. The apex portion of the support bracket 94 is preferably configured to lie between the spindle-pulley 56 and the strand-feed mechanism 68 along the length of the shaft 58. The support bracket 94 is also configured to avoid interference with the belt 60 which engages the spindle-pulley 56.

The strand-feed mechanism 68 is configured to move the plunger 86 translationally along the axis of the shaft 58 and within the plunger-bore 84 to draw the strands 64 from the spool 76 and push the strands 64 toward and out of the strand head 72. The solenoid 92, when electrically energized magnetically draws or pushes the plunger 86 toward the strand head 72. When the solenoid 92 is de-energized, a spring 96 coupled between the plunger 86 and the shaft 58 pushes the plunger 86 toward the strand canister 66 to resume an initial position. It is understood, that the operation of the solenoid 92 and spring 96 can be reversed without departing from the scope of embodiments described herein.

The plunger 86 includes a plurality of teeth 98 that extend radially outward therefrom and at a downwardly inclined angle. The teeth 98 engage the strands 64 when the plunger 86 is moved toward the strand head 72 such that the strands 64 are moved toward the strand head 72 along with the plunger 86. When moved in the opposite direction, the teeth 98 of the plunger 86 release and slide along the surface of the strands 64 thus allowing the plunger 86 to move relative to the strands 64 and toward the strand canister 66. By this operation, the strands 64 can be incrementally fed out of the strand head 72 as desired. The feeding of the strands 64 is produced by a positive and controlled operation of the strand-feed mechanism 68 and does not rely on centrifugal forces applied by rotation of the cutter-spindle assembly 40 and does not require the trimming operation to be halted to allow additional strand 64 to be fed out; the strand 64 can be fed out on-the-fly.

A catch 99 may be provided in the plunger-bore 84 vertically above the plunger 86 and above the maximum vertical position thereof. The catch 99 is configured to enable movement of the strands 64 toward the strand head 72 when pushed/pulled by actuation of the plunger 86, but to prevent movement of the strands 64 in an opposite direction toward the strand canister 66 when the plunger 86 moves to return to its initial position. The catch 99 may include one or more teeth or downwardly angled flanges like the teeth 98 of the plunger 86 or may include one or more frictional elements that provide a frictional engagement with the strands 64 sufficient to resist movement of the strands 64 toward the strand canister 66 when the plunger 86 slides along the strands 64 but that does not substantially impede the plunger 86 from drawing the strands 64 through the catch 99 when feeding out additional lengths of the strands 64.

Figure 8:
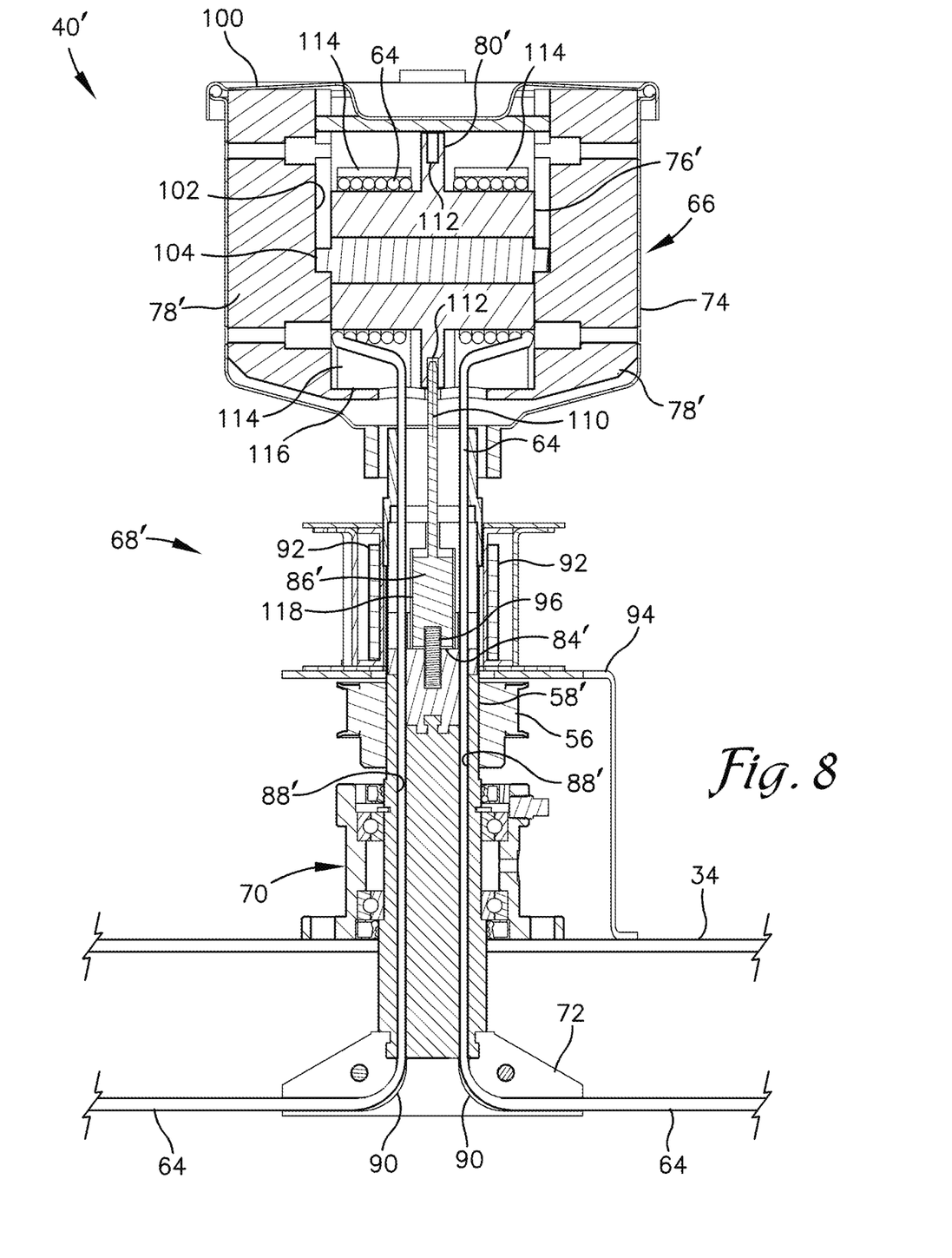
FIG. 8 is a cross-sectional view of another cutter-spindle assembly for the strand trimmer of FIG. 1 depicted in accordance with an exemplary embodiment and taken along line 5-5 of FIG. 4.
Figure 9:
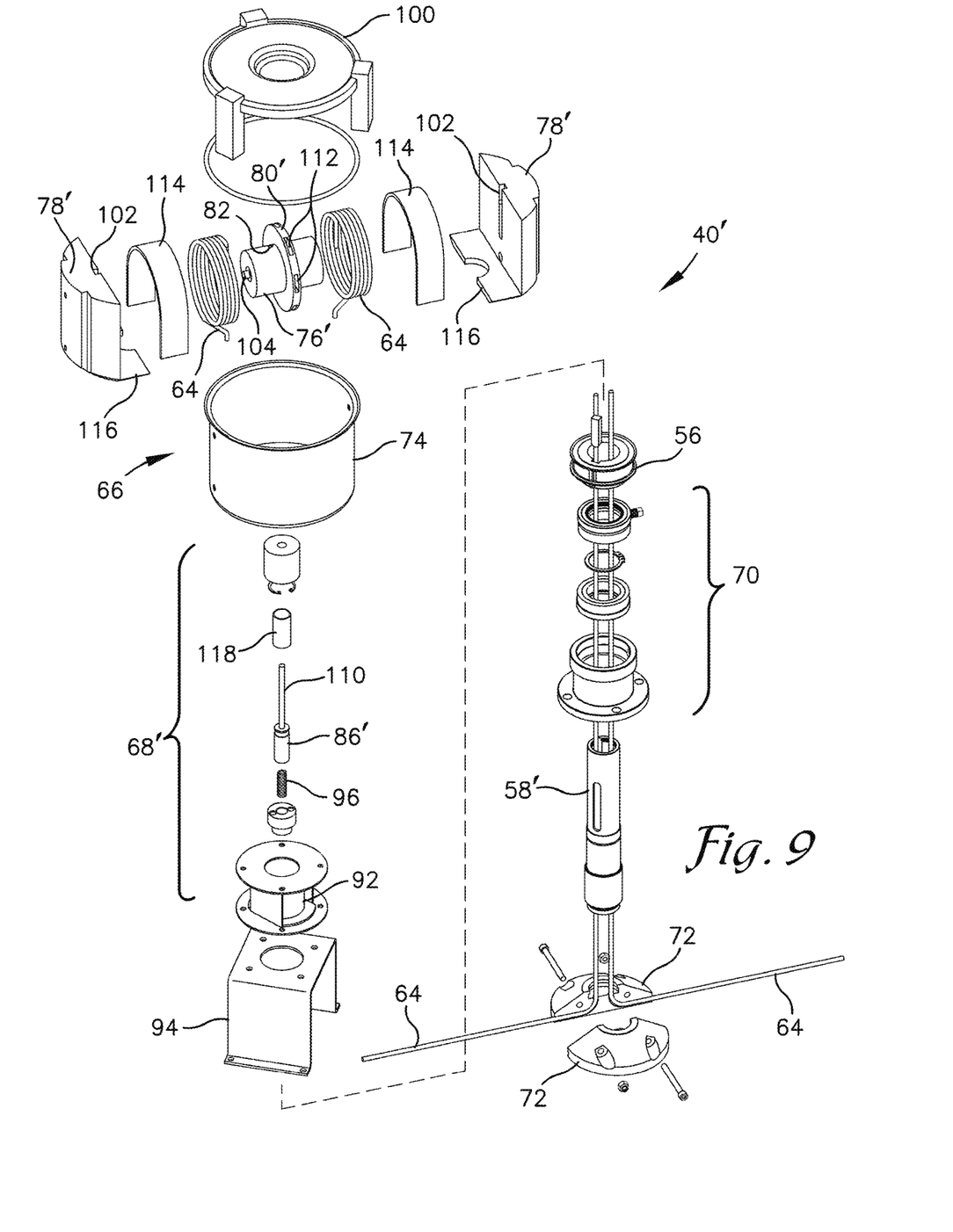
FIG. 9 is an exploded view of the cutter-spindle assembly of FIG. 8.
Figure 10:
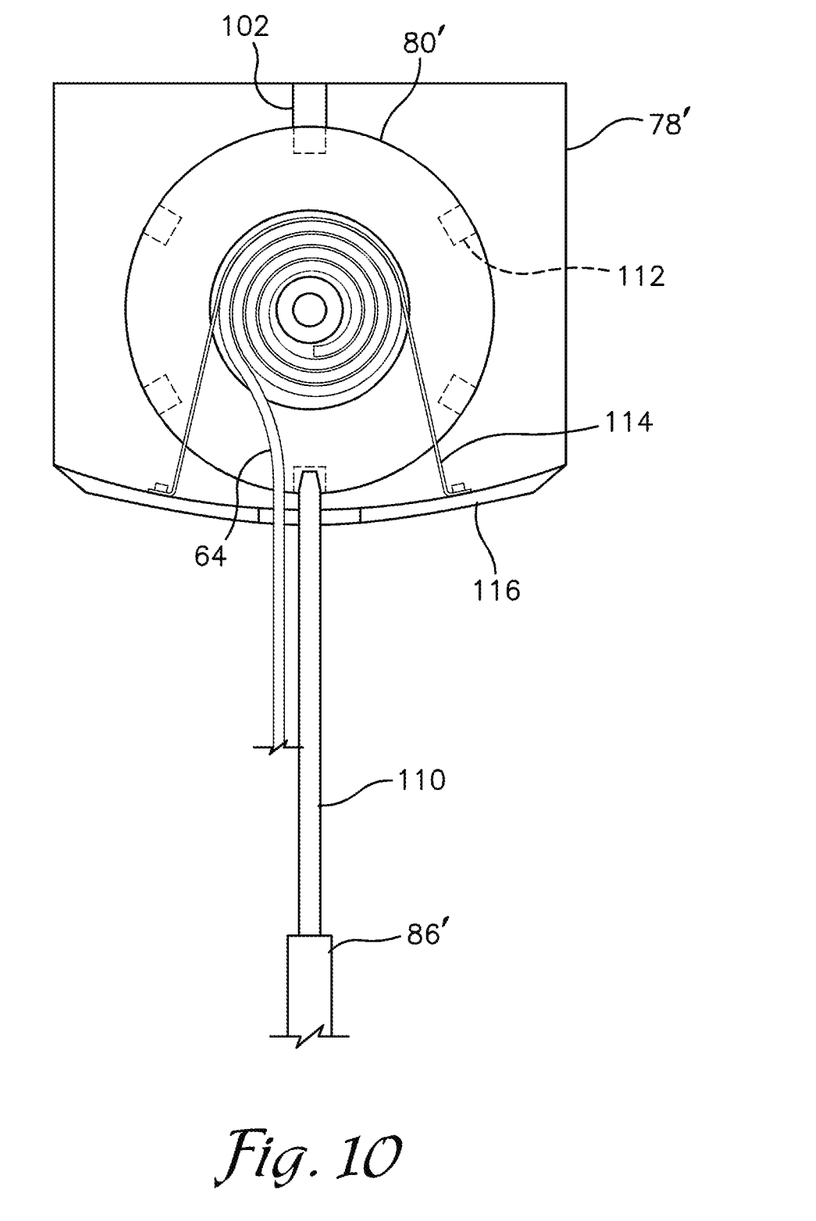
FIG. 10 is a partial side elevational view of a spool engaged by a prong on a plunger depicted in accordance with an exemplary embodiment.

In another embodiment depicted in FIGS. 8-10, another strand-feed mechanism 68' is described in accordance with another exemplary embodiment. The strand-feed mechanism 68' is configured similarly to the strand-feed mechanism 68 and includes many similar features and components including a plunger 86' and solenoid 92 combination that are operable to move the plunger 86' axially along and within the plunger-bore 84' in the shaft 58'. The plunger 86', however, does not include the teeth 98 of the plunger 86 for engaging the strands 64 The plunger 86' is provided with a plunger-bore 84' that separates the plunger 86' from the strands 64. The plunger-bore 84' comprises a blind bore that extends coaxially into an end of the shaft 58'. The plunger-bore 84' may have a diameter that is larger than that of the plunger 86'. A sleeve comprised of a plastic, brass, or other non-magnetic material may be installed in the plunger-bore 84' between the plunger 86' and a sidewall of the plunger-bore 84 to aid operational movements of the plunger 86' caused by the solenoid 92 and/or to provide a low friction contact surface for the plunger 86'.

Strand-passages 88' are provided alongside but separated from the plunger-bore 84' and extend substantially through the length of the shaft 58'. The strands 64 are allowed to freely pass through the strand-passages 88'.

The plunger 86' is configured to engage the spool 76' to selectively prevent rotation of the spool 76' about its axle 104. In one embodiment, the plunger 86' includes a prong 110 or other protuberance extending from an upper end thereof toward the spool 76' a sufficient distance to engage recesses, slots 112 or similar features formed in the spline 80' of the spool 76'. In another embodiment, the plunger 86' engages the spool 76' or the spline 80' directly, e.g. the plunger 86' does not include the prong 110. A plurality of the slots 112 are spaced about the perimeter of the spline 80' and are sized to receive a distal end of the prong 110 therein. In another embodiment, a plurality of tabs or other protuberances (not shown) extending radially outward from the spline 80' might be employed in place of the slots 112, such that rotation of the spool 76' is resisted by obstruction of movement of the tabs by the prong 110.

During operation of the strand trimmer 10, centrifugal force imparted on the distal ends of the strands 64 applies a tension force on the strands 64 between the distal ends and the spool 76'. The tension force operates to urge the spool 76' into rotation about its axle 104 to feed out additional lengths of the strands 64. In a normal state, the plunger 86' is biased upward toward the spool 76' by the spring 96 and the prong 110 on the plunger 86' is engaged in one of the plurality of slots 112 in the spool 76'. The spool 76' is thereby prevented from rotating about the axle 104 by engagement between the prong 110 and the slot 112. Actuation of the strand-feed mechanism 68' energizes the solenoid 92 to momentarily draw the plunger 86' downward and away from the spool 76'. In one embodiment, the plunger 86' is drawn downward for less than one second or only for a few milliseconds. The prong 110 is thus removed from the slot 112 in the spool 76' and the spool 76' is allowed to rotate about its axle 104. The tension force on the strands 64 causes the spool 76' to rotate and feed out an additional length of the strands 64. The solenoid 92 is de-energized and the spring 96 moves the plunger 86' upward toward the spool 76' to engage the prong 110 with another of the slots 112 in the spline 80' of the spool 76'. The timing or duration of the energizing of the solenoid 92 can be configured to cause the prong 110 to engage the next or adjacent slot 112 in the spline 80' or to engage any subsequent slot 112. The spacing of the slots 112 along the spline 80' may generally correspond to increments of length of the strands 64 to be fed from the trimmer head 72.

One or more straps 114 may be installed over the spool 76' to slow the rotation thereof about the axle 104 when the prong 110 is disengaged from the slots 112. A strap 114 may be disposed to overlie the coiled strand 64 on either or both sides of the spline 80' or over the spline 80' itself. The straps 114 are coupled to a component within the strand-feed mechanism 68' that does not rotate with the spool 76' as the spool 76' feeds out the strands 64. As depicted in FIGS. 8-10, the straps 114 are coupled to flanges 116 extending from the spacers 78' disposed at either end of the axle 104 of the spool 76'. The straps 114 frictionally engage the spool 76' to at least partially resist rotational movements thereof. The straps 114 are preferably formed from a rubber or similar material that provides a desired frictional engagement with the spool 76'. The straps 114 may be extensible and/or have an adjustable length to allow a tension in the straps 114 to be tailored to increase or decrease the frictional engagement with the spool 76'. In another embodiment, a bearing or similar component is coupled to or integrated with the axle 104 of the spool 76' to provide resistance to rotation thereof instead of or in addition to the straps 114.

With continued reference to FIGS. 1-6, operation of the strand trimmer 10 is described in accordance with an exemplary embodiment. Operation of the strand trimmer 10 is described with respect to the cutter-spindle assembly 40 and the strand-feed mechanism 68 for simplicity, however it is understood that the cutter-spindle assembly 40' and strand-feed mechanism 68' may also be employed in embodiments. Initially, the strand trimmer 10 is coupled to the boom 4 of the tractor 6 and the tractor 6 positioned alongside the guard rail 8. The strand trimmer 10 is positioned over the guard rail 8 with the trimmer arms 14 extending opposite the direction of travel of the tractor 6. The actuators 46 of the biasing mechanisms 44 for the trimmer arms 14 are actuated to pivot the trimmer arms 14 away from one another. The strand trimmer 10 can then be lowered toward the guard rail 8 to place one trimmer arm 14 on each side of the guard rail 8. The actuators 46 are then actuated to move the trimmer arms 14 toward one another. In this operational position the trimmer arms 14 extend toward one another and at generally acute angles relative to the guard rail 8. In one embodiment, the actuators 46 may be placed in a floating mode or non-pressurized mode and the bias of the telescoping rods 48 allowed to draw the trimmer arms 14 toward one another. Alternatively, the guard rail 8 may be engaged at an end thereof in a manner similar to that described below.

Operation of the cutter-spindle assemblies 40 is initiated. The motors 36 on each trimmer arm 14 are energized, such as by applying a flow of hydraulic fluid therethrough. The motors 36 thus rotate the drive pulleys 54 which in turn rotate the cutter-spindle assemblies 40 via their respective belts 60. As such, all of the components of each cutter-spindle assembly 40 are rotated about an axis extending coaxially through the shaft 58, e.g. the strand-canister 66, the spool 76, the plunger 86, the shaft 58, and the strand head 72 are all rotated as a unit. Rotation of the cutter-spindle assemblies 40 functions to move the strands 64 extending from the strand head 72 through a circular stand path at a rotational speed sufficient to cut through vegetation when struck by the ends or along the length of the strands 64.

The strands 64 may deteriorate or portions thereof may be worn away or broken off during operation of the strand trimmer 10. Additional lengths of strand 64 can be fed from the spool 76 in the strand canister 66 by energizing the solenoid 92 of the strand-feed mechanisms 68. Doing so feeds incremental lengths of the strands 64 from the spool 76 and feeds the strands 64 out of the strand head 72. When two strands 64 are employed in the cutter-spindle assembly 40, as depicted in FIGS. 1-6, both strands 64 are fed out simultaneously. Each of the strand-feed mechanisms 68 on the respective trimmer arms 14 may be actuated individually or they may be operated simultaneously. A blade (not shown) may be coupled to the underside of the body 34 to cut excess lengths of strand 64 such that a maximum strand length can be defined.

Orientation of the spool 76 to rotate about a horizontal axis to feed out the strand 64 reduces or eliminates any effects of centrifugal forces on the spool 76 produced by rotation of the cutter-spindle assembly 40. As such, binding, jamming, or otherwise unwanted effects on the strands 64 that are seen in known trimming devices and caused by centrifugal forces acting on the strand reservoirs are reduced or eliminated. In another embodiment the spool 76 may be oriented with the strand 64 coiled around a vertical axis. In this configuration, the strand 64 can be fed from an interior of the coil, e.g. nearest the vertical axis, to reduce or eliminate negative effects of centrifugal forces encountered by the strand 64 during rotation of the cutter-spindle assembly 40.

Upon exhaustion of the strand 64 on the spool 76, the spool 76 can be easily replaced. The housing 74 of the strand canister 66 includes a lid 100 that is removed to expose the empty spool 76. The empty spool 76 can be lifted and removed from the housing 74. The spacers 78 in the strand canister 66 may include a vertically extending slot 102 that accepts a respective end of an axle 104 in the spool 76 to support the spool 76 and to allow its removal from the housing 74.

Ends of strands 64 on the fresh spool 76 are fed through the opening 83 in the bottom wall of the strand canister 66, through the strand-passages 88 in the shaft 58, and through the interior passages 90 in the strand head 72. The fresh spool 76 is inserted into the housing 74 and the lid 100 replaced. In another embodiment, the spool 76 and the spacers 78 may be joined to form a cartridge that can be removed from the housing 74 in its entirety and replaced with a fresh cartridge or the strand canister 66 and all of its contents might be replaceable in its entirety. When employed in embodiments, the straps 114 may be decoupled or removed to enable removal of the spent spool 76 or 76' and then recoupled to the flange 116 or other feature after the fresh spool 76 or 76' is installed.

Figure 3:
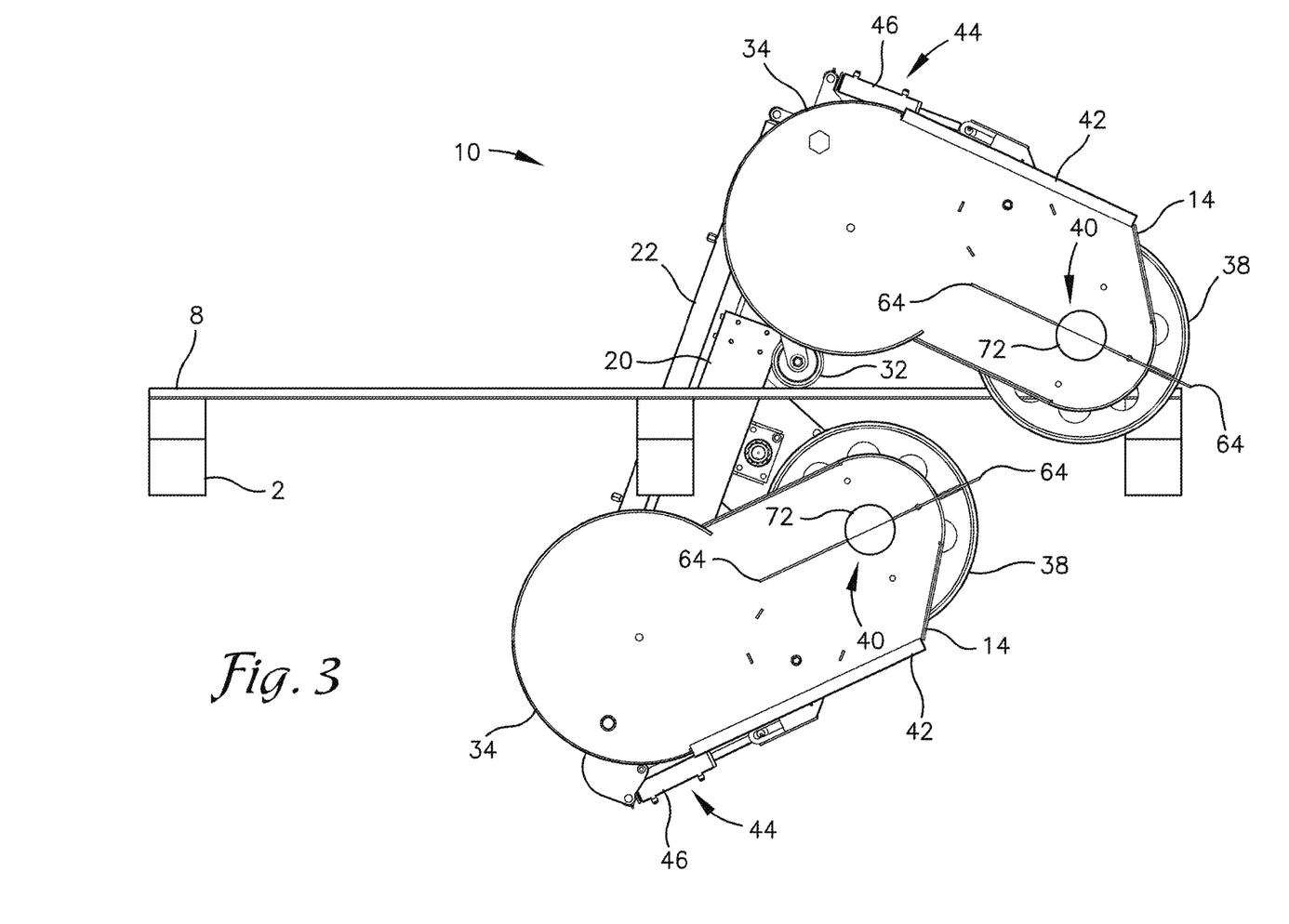
FIG. 3 is a bottom plan view of the strand trimmer of FIG. 1.

The strand trimmer 10 is moved along the length of the guard rail 8 with the trimmer arms 14 following behind the frame 12. The distal ends of the trimmer arms 14 are offset relative to the direction of travel to allow their respective stand paths to at least partially overlap when no obstacle is positioned therebetween. The roller guide 30 on at least one of the legs 18 is maintained in contact with the guard rail 8 to maintain the strand trimmer 10 generally centered relative to the guard rail 8. Movement of the cross-member 16 of the frame 12 within the mounting sleeve 20 further aids to maintain the strand trimmer 10 in the desired alignment with the guard rail 8 as the tractor 6 drives along on what may be uneven ground.

As the strand trimmer 10 is moved along the guard rail 8 obstacles such as a post 2 may be encountered and pass between the trimmer arms 14. The follower wheels 38 of the trimmer arms 14 contact the post 2 and roll therealong. Contact of the follower wheels 38 with the post 2 operates against the biasing mechanism 44 to pivot the respective trimmer arm 14 outwardly away from the post 2. The follower wheel 38 rolls along and follows the contour of the post 2 or other obstacle keeping the strand path in a desired proximity to the post 2, e.g. the strand path can be maintained such that the strands 64 contact the post 2 or are prevented from contacting the post 2. The biasing mechanism 44 maintains the follower wheel 38 in contact with the post 2 and upon clearing the post 2, the biasing mechanism 44 returns the trimmer arm 14 to its original position.

Figure 7:
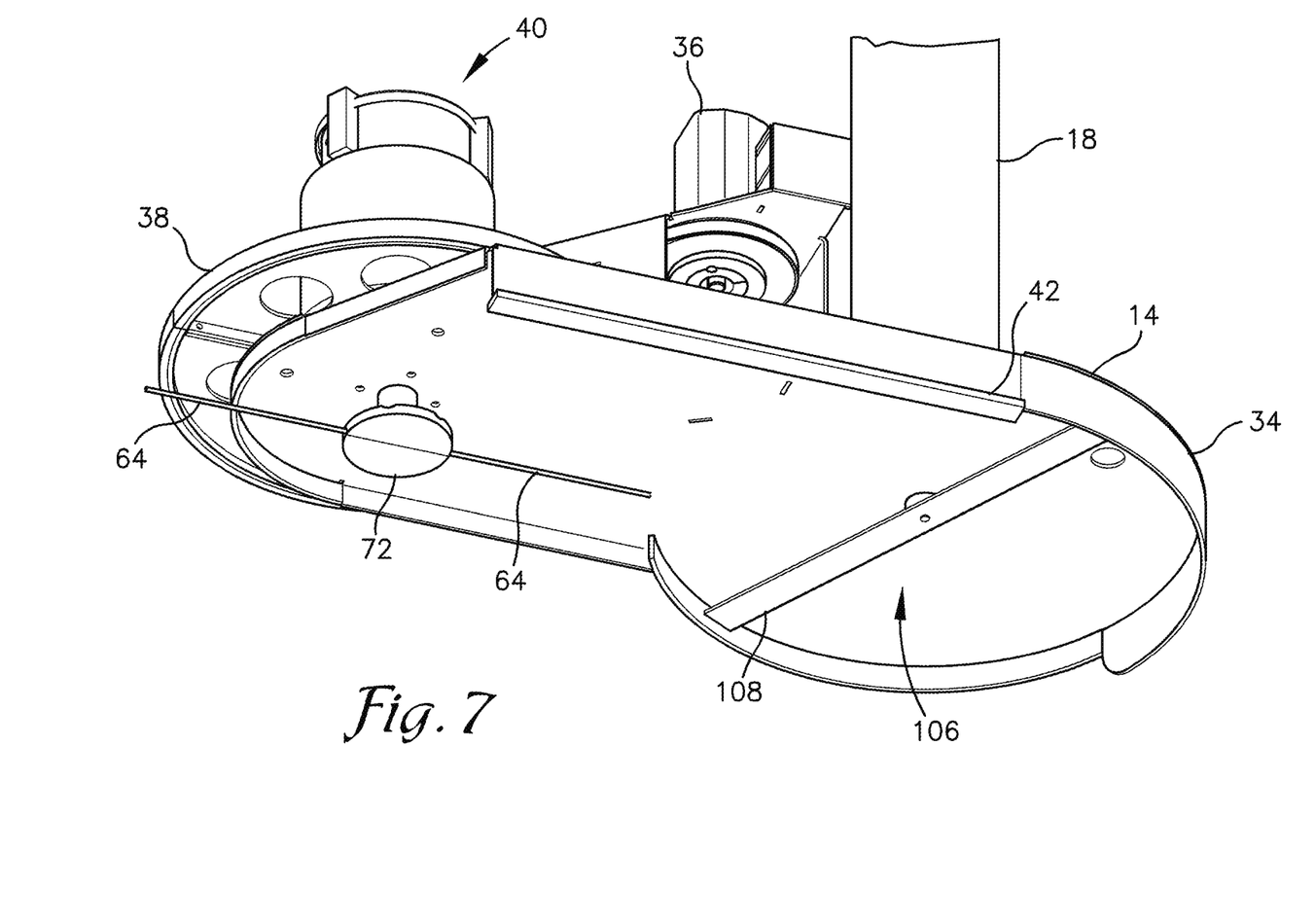
FIG. 7 is a bottom perspective view of a strand trimmer that includes a blade mower on each trimmer arm depicted in accordance with another exemplary embodiment.

With additional reference now to FIG. 7, in another embodiment the strand trimmer 10 may include secondary trimming elements 106 disposed along the length of each of the trimmer arms 14 between the pivotal coupling with the legs 18 and the cutter-spindle assembly 40. The secondary trimming elements 106 can comprise mowing blades 108 as depicted in FIG. 7, or the secondary trimming elements 106 might comprise strand trimmer units configured similarly to the cutter-spindle assembly 40 among other configurations. The secondary trimming elements 106 can be mechanically, hydraulically, electrically, pneumatically, or otherwise powered and can be powered via the same or different power circuit than that used to operate the motor 36. The secondary trimming elements 106 may increase the width of a trimming or mowing path that is provided by the strand trimmer 10 along each side of the guard rail 8. The secondary trimming elements 106 may also enable more diverse application of the strand trimmer 10 in applications in open areas in which known mowing devices might otherwise be employed, e.g. not around obstacles such as guard rails 8.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A strand trimmer comprising:
   a trimmer body;
   a cutter-spindle assembly rotatably mounted relative to the trimmer body and rotatable about an axis, the cutter-spindle assembly including a shaft aligned coaxially with the axis, the shaft including a bore aligned coaxially with the axis and extending along at least a portion of the length of the shaft, a plunger disposed within the bore in the shaft and being moveable axially within the bore;

a strand canister coupled to the shaft, the strand canister including an opening into the bore in the shaft;

a spool disposed in the strand canister and including a strand wound thereon; and a solenoid supported on the trimmer body and encircling the plunger, the solenoid operable to move the plunger axially within the bore to disengage a protuberance from the spool to allow the spool to rotate relative to the strand canister and feed out a length of the strand, the shaft and the plunger being rotatable within the solenoid which does not rotate with the shaft.

* * * * *